United States Patent [19]
Yamasaki et al.

[11] Patent Number: 5,644,595
[45] Date of Patent: *Jul. 1, 1997

[54] METHOD AND APPARATUS FOR AN ADAPTIVE THREE TAP TRANSVERSAL EQUALIZER FOR PARTIAL-RESPONSE SIGNALING

[75] Inventors: Richard G. Yamasaki, Torrance; Tzu-Wang Pan, Irvine, both of Calif.

[73] Assignee: Texas Instruments Incorporated, Dallas, Tex.

[ * ] Notice: The term of this patent shall not extend beyond the expiration date of Pat. No. 5,467,370.

[21] Appl. No.: 456,654

[22] Filed: Jun. 2, 1995

Related U.S. Application Data

[63] Continuation of Ser. No. 217,493, Mar. 24, 1994, Pat. No. 5,467,370.

[51] Int. Cl.$^6$ .............................. H03H 7/30; G11B 5/035
[52] U.S. Cl. .............................. 375/232; 375/290; 333/18; 360/65; 364/724.2
[58] Field of Search .................................... 375/229–233, 375/290; 333/18, 28 R; 360/68; 364/724.16, 724.19, 724.2

[56] References Cited

U.S. PATENT DOCUMENTS

| | | | |
|---|---|---|---|
| 4,422,175 | 12/1983 | Bingham et al. | 375/232 |
| 4,575,857 | 3/1986 | Murakani | 375/230 |
| 5,060,088 | 10/1991 | Dolivo et al. | 360/46 |
| 5,067,137 | 11/1991 | Kaneko | 375/232 |
| 5,175,747 | 12/1992 | Murakami | 375/232 |
| 5,247,541 | 9/1993 | Nakai | 375/233 |

*Primary Examiner*—Young T. Tse
*Attorney, Agent, or Firm*—W. Daniel Swayze, Jr.; W. James Brady, III; Richard L. Donaldson

[57] ABSTRACT

An improved adaptive three tap transversal equalizer for partial-response signaling. The invention reduces the complexity of the hardware, as well as reducing the sensitivity of the equalizer to gain and timing errors. The present invention employs an algorithm based on sample values around zero. The resulting decrease in average magnitude of the error results in decreased sensitivity to gain errors. The algorithm of the present invention improves cancellation of sample timing errors. In the present invention, the coefficient of an adaptive cosine equalizer is updated by integration of a stochastic gradient. To calculate the gradient, the product of the quantized output from the previous sample and the output from the present sample is summed together with the product of the output from the previous sample and the quantized output from the present sample. In addition, the equalizer output is masked such that values quantizing to non-zero values are discarded in the update algorithm. In systems employing separate adaptive loops for gain control, timing recovery and equalization, the amount of undesired loop interaction is much reduced from that of prior art methods.

23 Claims, 3 Drawing Sheets

METHOD AND APPARATUS FOR AN ADAPTIVE THREE TAP TRANSVERSAL EQUALIZER FOR PARTIAL-RESPONSE SIGNALING

This application is a continuation of U.S. patent application Ser. No. 08/217,493, filed on Mar. 24, 1994, now U.S. Pat. No. 5,467,370.

BACKGROUND OF THE INVENTION

1. Field of the Invention

The present invention relates to the field of signal processing, and in particular, to signal processing in a partial-response (PR) read channel.

2. Background Art

Communication of voice and data signals is often accomplished by converting analog signals to digital signals. These digital signals are then transmitted from a transmitting device to a receiving device, converted back to analog, if necessary, and communicated to a user. This digital transmission is often performed through analog channels. Digital information is transmitted in the form of a "symbol" representing a digital value. In some cases, adjacent symbols can overlap, resulting in a phenomenon known as intersymbol interference. This interference can corrupt a digital transmission, leading to errors in the receipt of the digital information.

Using partial-response signaling allows a better handling of intersymbol interference and allows a more efficient utilization of the bandwidth of a given channel. In partial-response systems, a controlled amount of intersymbol interference can be allowed. The partial-response system is described by the polynomials 1+D, 1−D and $(1−D^2)$, also called duobinary, dicode, and class-IV, respectively.

Class IV partial-response waveforms are formed by the subtraction of binary waveforms two bit intervals apart. This process boosts midband frequencies making the system more immune to noise and distortion at both high and low frequencies. This is especially useful in a magnetic recording channel where, using a conventional inductive head, there is little signal at low frequencies and spacing losses can cause large attenuation at high frequencies.

Partial-response (PR) signaling allows a better handling of intersymbol interference and allows a more efficient utilization of the bandwidth of a given signal detection channel. A general description of partial-response signaling principles is given by P. Kabal and S. Paupathy in "Partial-Response Signaling", IEEE Transaction on Communications, Vol. COM-23, No. 9, September 1975, pp. 921–934.

Because class IV partial-response signaling for digital detection is especially suited for the magnetic recording channel, sampled amplitude detection can be applied for magnetic recording. To minimize the propagation of data errors, the signal is turned into a sequence of binary numbers. Procedures for determining the maximum likelihood sequence in the presence of noise can then be applied. With sequence detection, sequences of bits are detected and processed to minimize error.

With PR signaling, tasks such as maximum-likelihood sequence detection (MLSD) and sample time recovery have been described by G. D. Forney in "Maximum-Likelihood Sequence Estimation of Digital Sequences in the Presence of Intersymbol Interference", IEEE Transaction on Information Theory, Vol. IT-18, No. 3, May 1972, pp. 363–378, and by Mueller et al., "Timing Recovery in Digital Synchronous Data Receivers", IEEE Transactions on communications, Vol. COM-24, No. 5, May 1976, pp. 516–531.

Another task associated with PR signaling is equalizing the signal channel bandwidth response. Without proper shaping of the read signal, the signal samples will not be at their desired values, and errors will occur. An optimal channel is achieved by matching the unfiltered channel response to the desired PR response. Adaptive equalization of a magnetic recording PR channel is described in U.S. Pat. No. 5,060,088 granted to F. B. Dolivo, et al., and in R. D. Cideciyan, et al. "A PRML System for Digital Magnetic Recording", IEEE Journal on Selected Areas in Communications, Vol. 10, No. 1, January 1992, pp. 38–56.

In prior art systems, methods for equalization and timing recovery utilize the error from samples that quantize to values other than zero. Because the equalizer adaptation algorithm employs multiplication of these non-zero values, the prior art systems are sensitive to both amplitude and timing errors. These errors manifest directly in the tap coefficients of the equalizer and result in a mismatch between the channel characteristics and the equalizer frequency response.

In any system with multiple self adapting feedback loops, it is extremely desirable to have the loops orthogonal or non-interacting to minimize "hunting" or jittering about the desired loop operation points. By using non-zero valued samples, the equalization, automatic gain control (AGC) and timing recovery loops are interdependent, e.g. an adaptation in the gain control circuit will affect the adaptation of the equalizer.

One suitable design for a PR channel equalizer is the adaptive cosine equalizer (ACE). An adaptive cosine equalizer with an input sampler is shown in FIG. 1. Sampled input signal 100 ($x_n$) is provided to delay 101, and, as the first tap of the delay line, to multiplier 105. The output of delay 101 comprises second tap signal 102 ($x_{n-1}$) and is coupled to delay 103 and summing means 110. The output of delay 103 comprises the third tap signal 104 ($x_{n-2}$) that is provided to multiplier 107. Tap coefficient 106 (K) is provided to multipliers 105 and 107. Modified tap values 108 and 109, provided by multipliers 105 and 107, respectively, are coupled to summing means 110. Summing means 110 generates output signal 111 ($y_n$).

The input signal is sampled at times (nT+τ), where 'T' is the sampling period. The cosine equalizer is comprised of a delay line having two delay elements 101 anti 103 of value 'T', and three taps, 100, 102 and 104. The sample of the center tap 102, and the modified samples of the two outer taps 102 and 104, each of the outer taps weighted with tap coefficient 'K' 106, are combined in summing means 110 to form output sample '$Y_n$' 111. The output sample '$y_n$' is given by:

$$y_n = x_{n-1} + K(x_n + x_{n-2})$$

Taking the Fourier transform, the equalizer frequency response is shown to be that of a linear phase filter with $$|H(w)| = |1 + 2K\cos(w)|$$

where w=2πfT and 'f' is the sampling frequency. For values of K between zero and one-half, lower frequencies are boosted and higher frequencies are attenuated. For values of K between zero and negative one-half, the inverse is true. By varying K, the filter response can be tuned to counteract the effects of the unfiltered frequency response of the unfiltered channel. Ideally, where H'(w) is the frequency response of the unfiltered channel, $$|H'(w)H(w)|=\alpha$$

where $\alpha$=some chosen gain constant. This means that all actions of the channel on the signal are completely canceled by the actions of the equalizer, except for some possible phase contributions. An adaptive algorithm is used to update coefficient K such that the equalizer matches the channel as closely as possible.

FIG. 2 illustrates the adaptive cosine equalizer of Dolivo et al. Included in the drawing are apparatus for generating the sample-to-sample adjustments to the tap coefficient, $\Delta K_n$, and apparatus for generating the tap coefficient, $K_n$. Input signal 200 is coupled to delay 201, and provided as the first tap of the tapped delay line to summing means 207. Delay 201 provides signal 202 to delay 203, and also, as the second tap of the tapped delay line, to summing means 210. Delay 203 provides signal 204 as the third tap of the tapped delay line to summing means 207. Summing means 207 provides signal 208 to multiplier 205 and adaptive update means 213. Coefficient signal 206 is provided to multiplier 205. Multiplier 205 provides cosine term 209 to summing means 210. Summing means 210 generate output signal 211 that is provided to adaptive update means 213.

Within adaptive update means 213, quantization means 212 and 214 receive input signals 208 and 211, respectively. Subtraction means 215 also receive signal 211 on a positive input port. Quantization means 214 provide signal 236 to a negative input port of subtraction means 215. Subtraction means 215 provide error signal 216 to multiplier 218. Quantization means 212 provide signal 217 to multiplier 218. Output signal 219 of multiplier 218 is coupled to delay 220 and summing means 222. Delay 220 provides delay signal 221 to summing means 222. Summing means 222 generates incremental update signal 223, the stochastic gradient, that is provided to tap coefficient adjustment means 235.

Within tap coefficient adjustment means 235, incremental update signal 223 is provided to multiplier 224. High sample value 227 and low sample value 228 are provided to selector 226. Selector 226 provides signal 229 to multiplier 224. Multiplier 224 is coupled to loop delay 230 via signal 225. Loop delay 230 provides delayed signal 231 to a negative input port of subtraction means 232. Loop delay 230 models the latency of the coefficient update circuit. Subtraction means 232 provide coefficient signal 206 to delay 233 and multiplier 205 of the cosine filter. Delay 233 provides delayed signal 234 to a positive input port of subtraction means 232.

The updating algorithm of Dolivo et al. generates the stochastic gradient, $\Delta K_n$. The stochastic gradient is given by, $$\Delta K_n = e_n \hat{u}_n + e_{n-1} \hat{u}_{n-1}$$

where $$e_n = y_n - z_n$$

$$u_n = x_n + x_{n-2}$$

$\hat{u}_n$ is the quantized value of $u_n$ at sampling instant n. $z_n$ is the ideal quantized output of $y_n$. The quantization is performed such that $$\hat{u}_n(z_n) = \begin{cases} +1 & \text{for } u_n(y_n) > 0.5 \\ 0 & \text{for } -0.5 \leq u_n(y_n) \leq 0.5 \\ -1 & \text{for } u_n(y_n) < -0.5 \end{cases}$$

The circuit of FIG. 2 performs the operations above in the following manner. A tapped delay line comprising delays 201 and 203 generates signals $x_n$, $x_{n-1}$ and $x_{n-2}$. $x_n$ and $x_{n-2}$ are summed (means 207) to generate $u_n$ that is then quantized (means 212) into $\hat{u}_n$. $u_n$ is multiplied (means 205) by the coefficient $K_n$ to generate the cosine term that is summed (means 210) with $X_{n-1}$ to generate $Y_n$.

$y_n$ is quantized (means 214) into $z_n$, and then the difference (means 215) between $y_n$ and $z_n$ is taken as the error $e_n$. $\hat{u}_n$ and $e_n$ are multiplied (means 218) to generate the term $\hat{u}_n e_n$, which is delayed (means 220) to generate $\hat{u}_{n-1} e_{n-1}$. The stochastic gradient, $\Delta K_n$, is generated by summing (means 222) these two terms together.

The coefficient $K_n$ is generated by subtracting (means 232) $\Delta K_n$ from the previous coefficient $K_{n-1}$. This is equivalent to multiplying $\Delta K_n$ by negative one and supplying that to an integrator (means 232 and 233). To account for bandwidth limitations in the integrator hardware, a pre-scaling operation (means 224, 226, 227 and 228) is performed on $\Delta K_n$.

The circuit of FIG.2 is susceptible to misequalization due to gain control errors. Assuming a gain error factor $\beta$, $$y_n(\beta x_n) = \beta x_{n-1} + K(\beta x_n + \beta x_{n-2}) = \beta[x_{n-1} + K(x_n + x_{n-2})] = \beta y_n(x_n)$$

Thus, gain errors propagate proportionally from input to output of the equalizer. The incremental error seen by the adaptation circuit is:

$$\Delta K'_{n,error} \propto \beta y_n - z_n - (y_n - z_n) = y_n(\beta - 1)$$

The error is proportional to $y_n$. Therefore, larger values of yn are more sensitive to gain error. The updating algorithm will attempt to offset the low frequency gain error by adapting the low frequency characteristics of the cosine equalizer. This will cause the high frequency response of the equalizer to rise or fall erroneously. A less sensitive scheme is desired.

In addition to gain error sensitivity, the circuit of FIG. 2 is susceptible to timing errors. FIGS. 3A and 3B show the effect of timing errors on an isolated PR4 pulse and a dibit PR4 pulse, respectively. The "o" indicates the ideal sample point value and "x" indicates the phase-shifted sample point value. The errors $e_1$, $e_2$, $e_3$, etc. are the error signal caused by a sample timing error. For the isolated pulse of FIG. 3A, taking into account the direction of the errors, the summation of $\Delta K_n$ of the sample errors is $$\Sigma \Delta K_n = -e_2 + e_3 - e_2 + e_4 + e_3 - e_5 + e_4 - e_5 = 2(-e_2 + e_3 + e_4 - e_5)$$

It can be seen that, assuming relatively similar error magnitudes, error terms tend to cancel. However, for the dibit pulse of FIG. 3B, the summation of $\Delta K_n$ is $$\Sigma \Delta K_n = -2e_2 - 2e_6 = -2(e_2 + e_6)$$

For the dibit pulse, the errors don't cancel. The residual error can result in misequalization as it builds in the adaptation integrator over time. Because the circuit of FIG. 2 is sensitive to gain and timing errors, adaptation of timing and gain loops will cause errors in the adaptation of the equalizer as the loops interact.

SUMMARY OF THE PRESENT INVENTION

The present invention provides an improved adaptive three tap transversal equalizer for partial-response signaling.

The present invention utilizes simple hardware, and reduces sensitivity of the equalizer to gain and timing errors. Whereas the prior art implementations employ an adaptation algorithm utilizing sample values that quantize to non-zero values, the present invention employs an algorithm based solely on sample values around zero. The resulting decrease in average magnitude of the error results in decreased sensitivity to gain errors. In addition, the algorithm of the present invention improves cancellation of sample timing errors.

In the present invention, the coefficient of an adaptive cosine equalizer is updated by integration of a stochastic gradient. The stochastic gradient calculation is based on the output of the equalizer and the quantized value of the output. Unlike prior art equalizers, the error between the quantized output and the unmodified output is not calculated. Instead, the product of the quantized output from the previous sample and the output from the present sample is summed together with the product of the output from the previous sample and the quantized output from the present sample. In addition, the equalizer output is masked such that values quantizing to non-zero values are discarded in the update algorithm. Calculating the stochastic gradient in this manner results in a reduction of sensitivity to gain errors and a more efficient cancellation of sample timing errors. In systems employing separate adaptive loops for gain control, timing recovery and equalization, the amount of undesired loop interaction is much reduced from that of prior art methods.

DETAILED DESCRIPTION OF THE PRESENT INVENTION

A method and apparatus for implementing a three tap transversal equalizer are described. In the following description, numerous specific details, such as tap coefficient adjustment implementations, are described in order to provide a more thorough description of the present invention. It will be apparent, however, to one skilled in the art, that the present invention may be practiced without these specific details. In other instances, well-known features have not been described in detail in order not to unnecessarily obscure the present invention.

The preferred embodiment of the present invention is employed as part of a read channel for data recovery in a magnetic storage system. It is suitable however for any channel in which cosine equalization is appropriate. The apparatus of the present invention performs equalization of partial-response signals without the sensitivity to gain and timing errors shown by prior art systems.

The adaptation algorithm of the present invention overcomes the disadvantages of the prior art. The algorithm of the present invention masks out sample values falling outside the zero-valued quantization region. The stochastic gradient of the present invention is given by the following equation.

$$\Delta K_n = e_n z_n^* z_{n-1} + e_{n-1} z_{n-1}^* z_n$$

where $$z_n^* = \begin{cases} 0, & \text{for } z_n \neq 0 \\ 1, & \text{for } z_n = 0 \end{cases}$$

However, since $e_n = y_n - z_n$, and $e_n$ is only evaluated when $z_n = 0$ (i.e. $e_n = y_n$), the relationship can be rewritten as:

$$\Delta K_n = y_n z_n^* z_{n-1} + y_{n-1} z_{n-1}^* z_n$$

This relationship does not require the subtraction means for generating $e_n$, as is required in the prior art. The multiplication operations required to generate the stochastic gradient, $\Delta K_n$, are trivial as $z_n^*$ can only have values of one or zero, and $z_n$ can only have values of one, zero or negative one. Because of the simplicity of this algorithm, the adaptation circuit requires less complicated hardware.

The sensitivity of the equalizer to gain fluctuations is minimized by the masking of the sample values. The masking process of the present invention serves to limit the magnitude of the sample values used in the adaptation algorithm, actually substituting zeroes for the samples outside of the quantization threshold. The contributions to the stochastic gradient due to gain errors are proportional to the magnitude of the equalizer output. The masking operation of the present invention acts to filter out the largest contributors to gain error misequalization. Therefore, the present invention exhibits more robust behavior when subjected to the influence of adaptive gain control loops.

Figure 1:
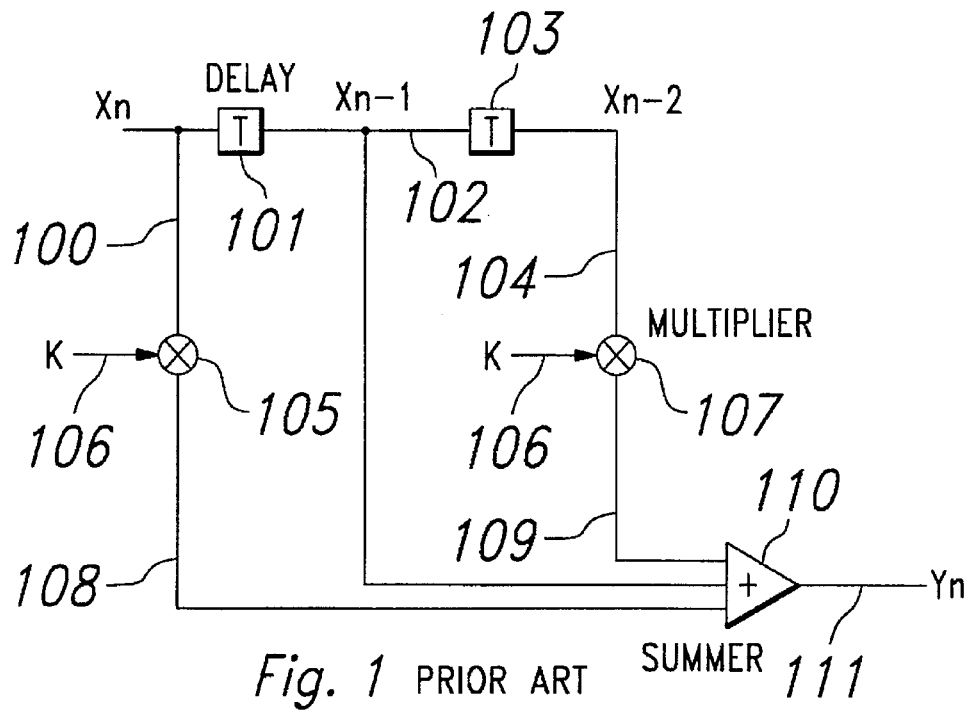
FIG. 1 is a block diagram of a cosine equalizer.
Figure 3A:
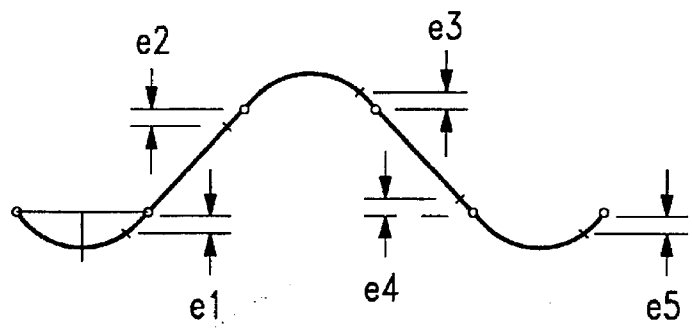
FIG. 3A is a timing diagram of sample timing errors in an isolated pulse.

The present invention is also less sensitive to sample timing errors. Such errors can occur from the adaptation of timing recovery loops. With reference to FIG. 3A, the integration of the stochastic gradient over the duration of the isolated pulse results in the following error summation.

$$\Sigma \Delta K n = -e_1 + e_4$$

Figure 3B:
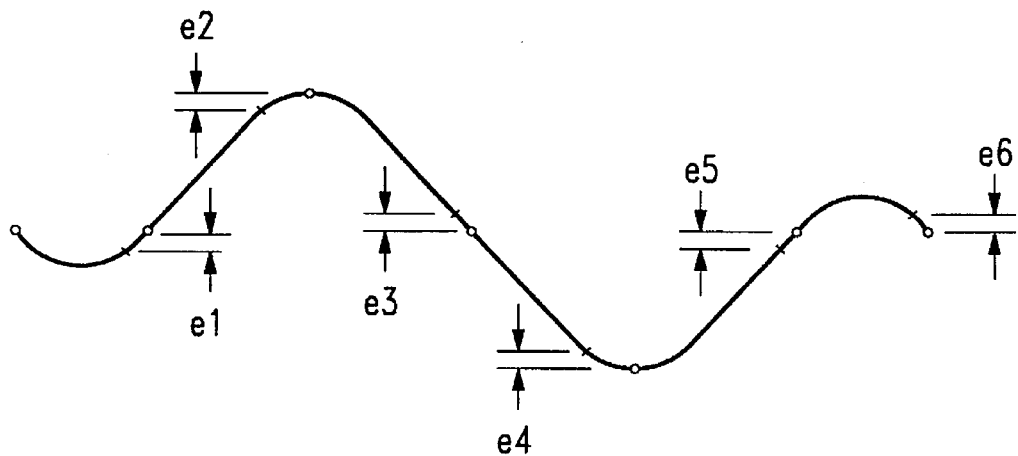
FIG. 3B is a timing diagram of sample timing errors in a dibit pulse.

Similarly, the error summation for the dibit case of FIG. 3B provides the following result.

$$\Sigma \Delta K n = -e_1 + e_3 - e_3 + e_5 = -e_1 + e_5$$

These residual error terms are largely reduced when compared with the error summations for the prior art. The terms that do remain are of opposite sign and tend to cancel each other out. Therefore, the performance of the present invention in the presence of sample timing errors is much improved over that of the prior art.

Figure 4:
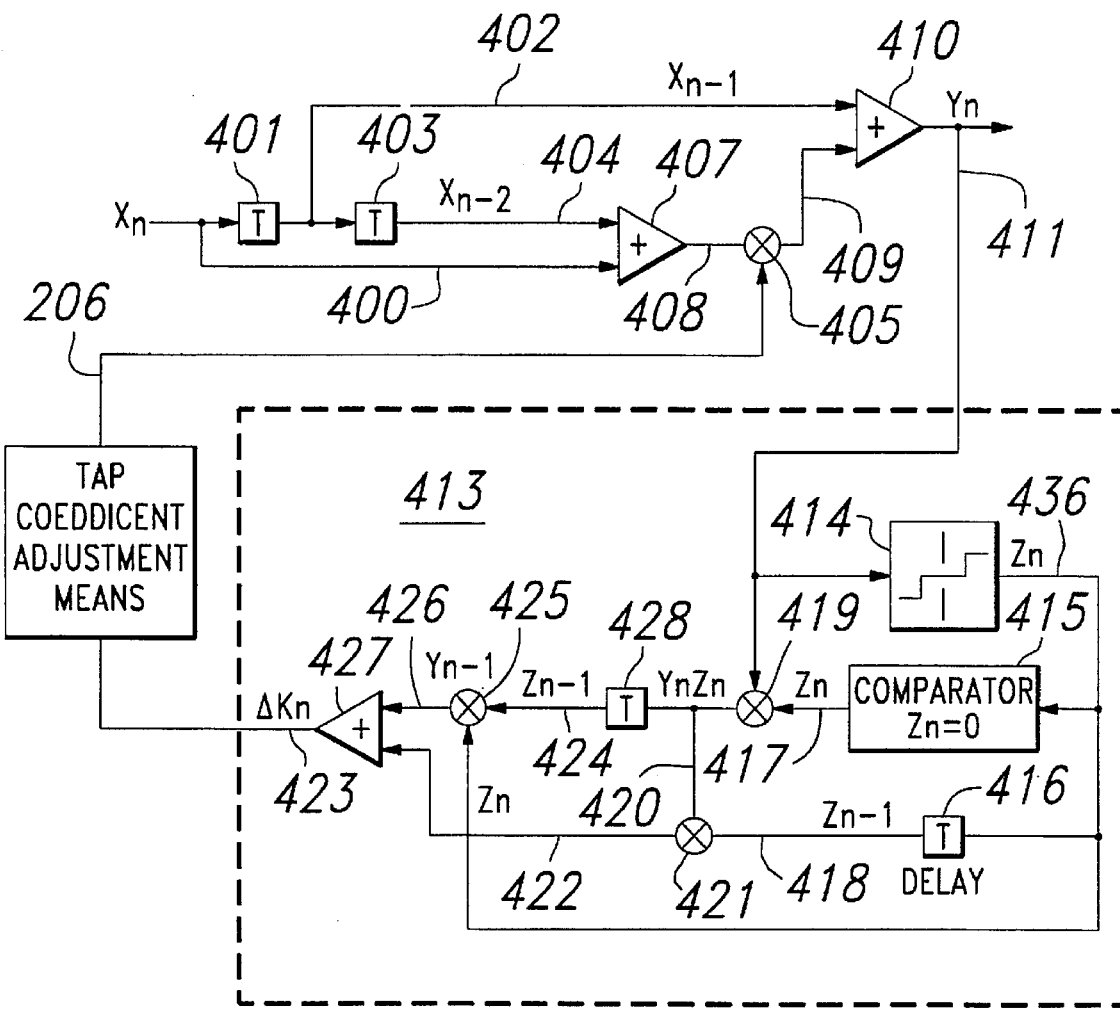
FIG. 4 is a block diagram of the preferred embodiment of the present invention.

FIG. 4 shows a block diagram of the preferred embodiment of the adaptive equalizer of the present invention. Input sample signal 400 is provided to delay 401 and summing means 407. Delay 401 provides delay signal 402 to delay 403 and to summing means 410. Delay 403 provides delay signal 404 to summing means 407. Summing means 407 generate signal 408 and provide it to multiplier 405. Multiplier 405 also receives tap coefficient signal 406 from tap coefficient adjustment means 435. Multiplier 405 provides cosine term 409 to summing means 410. Summing means 410 generate output signal 411 that is provided to adaptive update means 413.

Within adaptive update means 413, signal 411 is provided to quantization means 414 and multiplier 419. Quantization means 414 provide quantized signal 436 to comparator means 415, delay 416 and multiplier 425. Comparator means 415 supply signal 417 to multiplier 419. Delay 416 provides delay signal 418 to multiplier 421. Multiplier 419 provides signal 420 to delay 428 and multiplier 421. Multiplier 421 provides signal 422 to summing means 427. Delay 428 provides delay signal 424 to multiplier 425. Multiplier 425 provides signal 426 to summing means 427. Summing means 427 generate incremental update signal 423, and provides it to tap coefficient adjustment means 435.

The cosine filter comprises delays 401 and 403, summing means 407 and 410, and coefficient multiplier 405. The tapped delay line (delays 401 and 403) provides the first and third taps, $x_n$ and $x_{n-2}$, to summing means 407. The resultant sum is multiplied (means 405) by the coefficient value $K_n$ and then summed (means 410) with the center tap, $x_{n-1}$, from the tapped delay line to generate $y_n$. The output is sent along to the next device in the channel and to the adaptive update means 413.

Within adaptive update means 413, $y_n$ is quantized (means 414) to generate $z_n$. $z_n$ is subsequently compared (means 415) with zero to generate $z_n^*$. Delay 416 serves to generate $z_{n-1}$. $y_n$ and $z_n^*$ are multiplied (means 419) to generate $y_n z_n^*$ and delayed (means 428) to generate $y_{n-1} z_{n-1}^*$. $y_n z_n^*$ is multiplied (means 421) with $z_{n-1}$ and $y_{n-1} z_{n-1}^*$ is multiplied (means 425) with $z_n$. The two products are summed (means 427) to generate $\Delta K_n$ that is provided to tap coefficient means 435.

Figure 2:
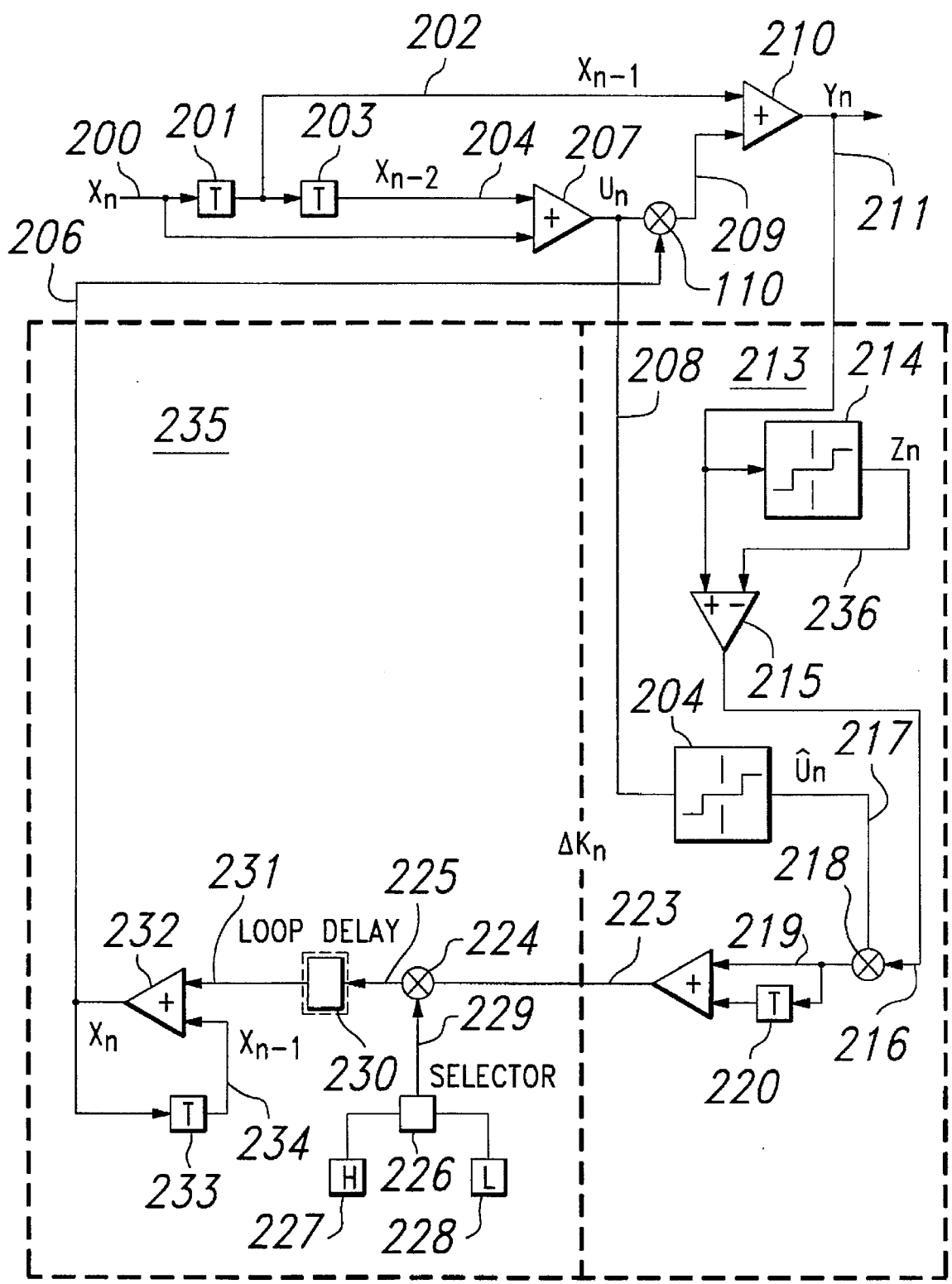
FIG. 2 is a block diagram of an adaptive cosine equalizer of the prior art.

Tap coefficient means 435 utilizes the stochastic gradient $\Delta K_n$ to generate coefficient $K_n$. For a digital implementation of the tap coefficient adjustment means, a circuit such as that shown in block 235 of FIG. 2 can be used. However, it is possible to implement the circuit in the analog domain as well.

Figure 5:
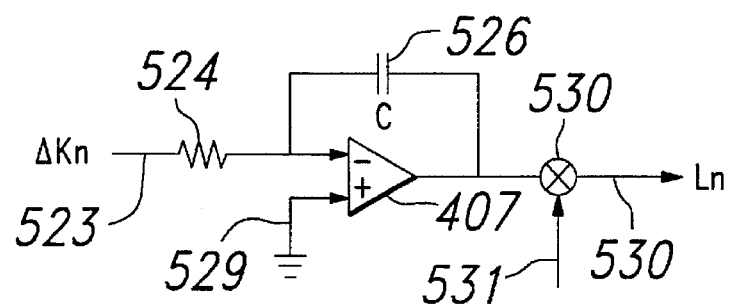
FIG. 5 is a circuit block diagram of an analog tap coefficient adjustment means for use in the present invention.

FIG. 5 shows a circuit diagram of a possible analog implementation of a tap coefficient adjustment means for use in the present invention. Analog incremental update signal 523 is coupled to resistor 524. Resistor 524 is further coupled to a negative input port of amplifier 528. Capacitor 526 is coupled across the output port and the negative input port of amplifier 528. Ground signal 529 is coupled to a positive input port of amplifier 528. Multiplier 530 receives sample rate signal 531 and the output of amplifier 528. Multiplier 530 generates tap coefficient signal 506.

The circuit of FIG. 5 represents a simple analog integrator comprising an amplifier with input resistance and capacitive feedback. To compensate the integrator time constant for sample rate effects, the integrator output can be multiplied by a signal proportional to the sample rate.

Thus, an adaptive three tap transversal equalizer with reduced gain and timing sensitivity has been provided.

What is claimed is:

1. An apparatus for equalizing a channel comprising:

equalizing means coupled to said channel, said equalizing means receiving at least one coefficient signal and providing an equalized output signal; and equalizer update means coupled to said equalizing means, said equalizer update means receiving said equalized output signal and providing said at least one coefficient signal based upon at least one past value of said equalized output signal and at least one present value of said equalized output signal, said equalizer update means comprising masking means coupled to said equalized output signal, said masking means suppressing an error signal when said equalized output signal lies beyond a specified range, said error signal based on said equalized output signal.

2. The apparatus of claim 1 wherein said equalizing means comprises a cosine equalizer.

3. The apparatus of claim 2 wherein said cosine equalizer comprises:

tapped delay means coupled to said channel, said tapped delay means providing first, second and third sample signals;

multiplying means coupled to said at least one coefficient signal, said multiplying means further coupled to said first and third sample signals; and summing means coupled to said second sample signal and to said multiplying means, said summing means providing said equalized output signal.

4. The apparatus of claim 1 wherein said equalizer update means further comprises:

coefficient adjustment means providing said at least one coefficient signal, said coefficient adjustment means receiving an update signal; and adaptive update means coupled to said equalized output signal, said adaptive update means providing said update signal, said adaptive update means comprising said masking means.

5. The apparatus of claim 4 wherein said coefficient adjustment means comprises an integrator.

6. The apparatus of claim 4 wherein said adaptive update means further comprises gradient determining means coupled to said masking means.

7. The apparatus of claim 6 wherein said gradient determining means comprises:

quantizing means coupled to said equalized output signal, said quantizing means generating a quantized signal;

delay means coupled to said error signal and said quantized signal, said delay means providing a delayed error signal and a delayed quantized signal;

first multiplying means coupled to said error signal and said delayed quantized signal;

second multiplying means coupled to said delayed error signal and said quantized signal; and summing means coupled to said first and second multiplying means.

8. The apparatus of claim 1 wherein said error signal comprises the difference between said equalized output signal and a quantized output signal.

9. An apparatus for equalizing a channel comprising:

equalizing means coupled to said channel and providing an equalized output signal, said equalizing means receiving at least one coefficient signal;

coefficient adjustment means providing said at least one coefficient signal, said coefficient adjustment means receiving an update signal; and adaptive update means coupled to said equalized output signal, said adaptive update means providing said update signal, said adaptive update means comprising masking means coupled to said equalized output signal, said masking means suppressing an error signal when said equalized output signal is larger than a specified range, said error signal based on said equalized output signal.

10. The apparatus of claim 9 wherein said equalizing means comprises a cosine equalizer.

11. The apparatus of claim 10 wherein said cosine equalizer comprises:

tapped delay means coupled to said channel, said tapped delay means providing a first sample signal and second and third delay sample signals;

multiplying means coupled to said at least one coefficient signal, said multiplying means further coupled to said first sample signal and third delay sample signal; and summing means coupled to said second delay sample signal and to said multiplying means, said summing means providing said equalized output signal.

12. The apparatus of claim 9 wherein said adaptive update means further comprises gradient determining means coupled to said masking means.

13. The apparatus of claim 20 wherein said gradient determining means comprises:

quantizing means coupled to said equalized output signal, said quantizing means generating a quantized signal;

delay means coupled to said error signal and said quantized signal, said delay means providing a delayed error signal and a delayed quantized signal;

first multiplying means coupled to said error signal and said delayed quantized signal;

second multiplying means coupled to said delayed error signal and said quantized signal; and summing means coupled to said first and second multiplying means.

14. The apparatus of claim 9 wherein said coefficient adjustment means comprises an integrator.

15. The apparatus of claim 9 wherein said error signal comprises the difference between said equalized output signal and a quantized output signal.

16. A method for adaptively updating an equalizer comprising the steps of:

generating a gradient value from at least one past value and a present value of art error signal, said error signal based on an equalized output signal from said equalizer;

masking, prior to said gradient value generation, said error signal if said equalized output signal is outside a given threshold range;

integrating said gradient value to generate a coefficient value; and providing said coefficient value to said equalizer.

17. The method of claim 16 wherein said step of generating said gradient value comprises the steps of:

quantizing said equalized output signal to generate a present quantized value;

multiplying at least one past quantized value and said present value of said error signal to generate a first term;

multiplying said at least one past value of said error signal and said present quantized value to generate a second term; and summing said first and second terms to generate said gradient value.

18. The method of claim 16 wherein said error signal comprises the difference between said equalized output signal and a quantized output signal.

19. An apparatus for equalizing a PRML channel comprising:

an equalizer coupled to said PRML channel, said equalizer receiving a coefficient signal and providing an equalized output signal;

adaptive coefficient update means coupled to said equalizer, said adaptive coefficient update means providing said coefficient signal, said coefficient signal generated from a gradient signal based on an error between said equalized output signal and a quantized output signal, said quantized output signal having values of $-x$, 0 and $+x$, wherein x is a non-zero number; and masking means coupled to said equalizer and said adaptive coefficient update means, said masking means substituting a zero value for said error when a corresponding quantized output signal is not 0.

20. The apparatus of claim 19 wherein said equalizer comprises a cosine equalizer.

21. The apparatus of claim 19 wherein said adaptive coefficient update means comprise:

quantizer coupled to said equalized output signal, said quantizer generating said quantized output signal;

delay means receiving said error and said quantized output signal, said delay means providing a delayed error signal and a delayed quantized signal;

a first multiplier receiving said error and said delayed quantized signal;

a second multiplier receiving said delayed error signal and said quantized signal;

a summing circuit coupled to said first and second multipliers; and an integrator coupled to said summing circuit.

22. A method for adaptively updating a coefficient value for an equalizer in a PRML channel comprising the steps of:

quantizing an equalizer out-put signal to generate a quantized value;

generating an error signal comprised of a difference between said equalizer output signal and said quantized value;

masking out said error signal when said quantized value is non-zero;

generating a gradient value based on a past value and present value of said error signal; and integrating said gradient value to generate said coefficient value.

23. The method of claim 22 wherein said step of generating said gradient value comprises the steps of:

multiplying a past quantized value and said present value of said error signal to generate a first signal;

multiplying a present quantized value and said past value of said error signal to generate a second signal; and providing said first and second signals to a summing circuit to generate said gradient value.

* * * * *